United States Patent [19]
Mayer et al.

[11] 3,755,308
[45] Aug. 28, 1973

[54] NITROFURFURYLIDENEAMINO DERIVATIVE OF OCTAHYDROBENZTHIAZINE-1,-DIOXIDE AND PROCESS FOR ITS PREPARATION

[75] Inventors: Karl Heinrich Mayer, Opladen – Quettingen; Axel Haberkorn, Wuppertal-Eberfeld, both of Germany

[73] Assignee: Farbenfabriken Bayer Aktiengesellschaft, Leverkusen, Germany

[22] Filed: Apr. 19, 1971

[21] Appl. No.: 135,375

[30] Foreign Application Priority Data
Apr. 25, 1970 Germany.................. P 20 20 298.6

[52] U.S. Cl........... 260/240 A, 424/246, 260/243 R
[51] Int. Cl............................................. C07d 93/12

[58] Field of Search...................... 260/240 A, 243 R

[56] References Cited
UNITED STATES PATENTS
3,262,930  7/1966  Herlinger et al................ 260/240 A FOREIGN PATENTS OR APPLICATIONS
1,170,957  5/1964  Germany......................... 260/240 A
1,558,229  3/1968  France............................ 260/243 R

*Primary Examiner*—John D. Randolph
*Attorney*—Jacobs and Jacobs

[57] ABSTRACT

4-(5'-Nitrofurfurylideneamino)-octahydro-4H-1,4-benzthiazine-1,1-dioxide is obtained from 4-amino-octahydro-4H-1,4-benzthiazine-1,1-dioxide and 5-nitro-2-furfural, or a reactive derivative thereof. The compound has antiparasitic activity, particularly against *Trypanosoma cruzi*.

1 Claim, No Drawings

NITROFURFURYLIDENEAMINO DERIVATIVE OF OCTAHYDROBENZTHIAZINE-1,-DIOXIDE AND PROCESS FOR ITS PREPARATION

DETAILED DESCRIPTION

This invention pertains to the preparation of 4-(5'-nitrofurfurylideneamino)-octahydro-4H-1,4-benzthiazine-1, 1-dioxide, to the compound thereby produced and to the medicinal use of this compound, particularly its use in combatting *Trypanosoma cruzi*, the etiological factor in Chagas' disease, a wide-spread South American parasitic infection.

4-(5'-Nitrofurfurylideneamino)-octahydro-4H-1,4-benzthiazine-1, 1-dioxide, which can be diagrammatically depicted by the formula:

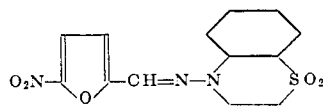

is prepared according to the present invention through the reaction of 5-nitro-2-furfural, or a reactive derivative thereof such as the oxime or a diester, as for example the diacetate, with 4-amino-octahydro-4H-1,4-benzthiazine-1,1-dioxide. Utilizing for example 5-nitro-2-furfural itself, the reaction can be depicted by the following equation:

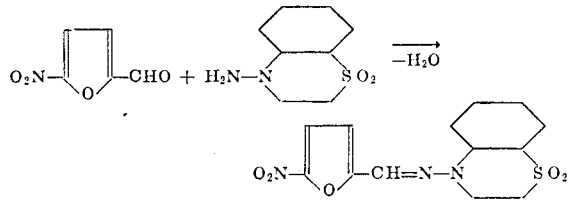

The reaction can be accelerated by the addition of catalytic amounts of acid including inorganic mineral acids, as for example hydrohalic acids, especially hydrochloric acid, and organic acids, especially aliphatic carboxylic acids having up to six carbon atoms such as acetic acid. The reaction is conducted at temperatures ranging from about 40° to about 120°C, preferably from about 60° to about 100°C. Although an excess of either reactant can be utilized, they are preferably employed in equimolar amounts. The reaction is generally performed in an inert organic solvent, preferably one in which both starting products are substantially soluble while the final product is substantially insoluble. Suitable solvents include aliphatic alchols having up to six carbon atoms, as for example methanol, ethanol, propanol or isopropanol and ethers, such as tetrahydrofuran or dioxane. The product thus is formed as a solid in the course of the reaction and can be isolated through conventional techniques, such as filtration of the cooled reaction mixture, and purified as through solvent washing or recrystallization.

The following example illustrates the preparation of the invention:

EXAMPLE 20.4 g.(0.1 mol) of 4-amino-octahydro-4H-1,4-benzthiazine-1,1-dioxide (melting point: 114°–116°C) are dissolved in 150 ml of methanol with warming. 0.1 ml of glacial acetic acid is introduced, followed by a solution of 14.1 g (0.1 mol) of 5-nitro-2-furfural in 25 ml of methanol, and the mixture is then heated to boil. After a short time, the reaction product crystallizes in the form of orange-red needles and after cooling, the precipitate is collected by filtration, washed with methanol, water and again with methanol. 29.6 of analytically pure material having the following analysis and of melting point 204°–205°C (uncorrected) are obtained.

Analysis: $C_{13}H_{17}N_3O_5S$ (327.3)
Calculated: C 47.7% H 5.23% N 12.8%
Found: 48.1% 5.30% 12.9%

The IR spectrum and the NMR spectrum are in agreement with the indicated structure.

The 4-amino-octahydro-4H-1,4-benzthiazine-1,1-dioxide used as the starting material is described in U.S. Pat. No. 3,547,090 and can be prepared by allowing 2-mercaptoethanol and cyclohexene oxide to react to give 2-(2-hydroxyethylmercapto)-cyclohexanol (boiling point (0.1 mm) 120°C). The latter is oxidized with hydrogen peroxide to yield the sulphone, which on treatment with dilute sodium hydroxide solution, without prior isolation, cyclizes to give octahydro-1,4-benzoxathiine-4,4-dioxide (melting point 118°–120°C). Reaction with hydrazine hydrate in the presence of catalytic amounts of sodium hydroxide solution yields the desired starting product.

As noted above, 4-(5'-nitrofurfurylideneamino)-octahydro-4H-1,4-benzthiazine-1,1-dioxide demonstrates excellent activity against *Trypanosoma cruzi*, the cause of South American trypanosomiasis, or Chagas' disease, and moreover is well tolerated. This activity can be conveniently observed as follows.

The compound was tested in mice infected with *Trypanosoma cruzi* and having an average weight of 18 to 22 g. The animals were treated subcutaneously on four successive days, starting one day after the infection, with the test substance suspended in water. Two to four animals were employed per dose. Blood samples of the treated animals and of the untreated control animals were microscopically examined for trypanosomes, in comparison with one another. The activity was assessed on the basis of differences in parasitaemia and/or survival time and it is expressed as follows:

Cure — no parasites detectable up to four weeks after the infection.

Partial Effect — first detection of trypanosomes not earlier than on the 8th day after infection.

Trace Effect — first detection of parasites, as in the untreated control animals, on the 7th day after infection, but less parasitaemia and/or longer survival time.

No Effect — course of the infection unchanged as compared with untreated control animals.

The results for the compound of the present invention are shown in Table I.

TABLE 1

Effect of 4-(5'-nitrofurfurylideneamino)-octahydro-4H-1,4-benzthiazine-1,1-dioxide against *Trypanosoma cruzi*

| Dose(mg/kg) | Effect |
|---|---|
| 2.5 | No effect |
| 5 | No effect |
| 10 | No effect |
| 25 | No effect |
| 50 | Trace effect |
| 100 | Partial effect |
| 250 | Cure |
| 500 | Cure |
| 1000 | Cure |

In contrast, the known 4-(5'nitrofurfurylideneamino)-tetrahydro-4H-1,4-thiazine-1,1-dioxide of U.S. Pat. No. 3,262,930, has a partial effect on trypanosoma infection but exhibits significant toxicity at doses as low as 250 mg/kg as seen in Table II.

TABLE II

Effect of
4-(5'-nitrofurfurylideneamino)-tetrahydro-
4H-1,4-thiazine-1,1-dioxide against
Trypanosoma cruzi

| Dose(mg/kg) | Effect |
|---|---|
| 2.5 | No effect |
| 5 | Partial effect |
| 10 | Partial effect |
| 25 | Partial effect |
| 50 | Partial effect |
| 100 | Partial effect |
| 250 | Lethal |
| 500 | Lethal |
| 1000 | Lethal |

Thus, while the corresponding tetrahydro-4H-1,4-thiazine compound shows a partial effect at lower doses, its toxicity prevents administration of a sufficiently high dose to effect a complete cure of the infection. The properties of the compound of the present invention is even more surprising in view of the fact that introduction of a second ring, as in 4-(5'-nitrofurfurylideneamino)-dodecahydro-4H-1,4-phenothiazine-1,1-dioxide results in a total loss of all activity as seen in Table III.

TABLE III

Effect of
4-(5'-nitrofurfurylideneamino)-
dodecahydro-4H-1,4-phenothiazine against
Trypanosoma cruzi

| Dose(mg/kg) | Effect |
|---|---|
| 2.5 | No effect |
| 5 | No effect |
| 10 | No effect |
| 25 | No effect |
| 50 | No effect |
| 100 | No effect |
| 250 | No effect |
| 500 | No effect |
| 1000 | No effect |

In the treatment of parasitic infections, according to this invention, 4-(5'-nitrofurfurylideneamino)-octahydro-4H-1,4-benzthiazine-1,1-dioxide is preferably administered orally or parenterally. In general it has proved advantageous to administer amount of from about 50 mg to about 250 mg/kg of body weight per day to achieve effective results. Nevertheless, it may at times be necessary to deviate from this range, in particular to do so as a function of the body weight of the animal, the nature of the route of administration, the species of animal, its response to medication, the nature of the formulation, and the interval between administration according to the dosage regimen. Thus in some cases, less than 50mg/kg will suffice while in others, more than 250 mg/kg will be required. When large amounts are administered, these can be divided into several individual administrations over the course of the day.

The method of treatment can be advantageous, effected through use of a pharmaceutical composition containing 4-(5'-nitrofurfurylideneamino)-octahydro-4H-1,4-benzthiazine-1,1-dioxide in admixture with a pharmaceutically acceptable inert solid or liquid carrier. The expression "pharmaceutically acceptable inert carrier" refers to a non-toxic substance which when mixed with 4-(5'-nitrofurfurylideneamino)-octahydro-4H-1,4-benzthiazine-1,1-dioxide facilitates its administration. The expression preferably excludes water and low molecular weight organic solvents commonly used in chemical synthesis, except in the presence of other pharmaceutically useful ingredients such as salts in correct quantities to render the composition isotonic, buffers, surfactants, coloring and flavoring agents and preservatives. Examples of suitable liquid carriers include vegetable oils, polyols, buffered aqueous solutions, isotonic saline aqueous solutions, syrups and lotion bases. Solid carriers include starches, cellulose and its derivatives, sugars, stearates, stearic acid, talc, and ointment bases.

A preferred form of the pharmaceutical compositions of the invention are those adapted for oral administration. Examples of pharmaceutical compositions according to the invention are aqueous suspensions, elixirs, syrups, and powders, either free-flowing or compressed into tablets. Preferred carriers for such compositions include one or more solid vehicles, excipients and lubricants such as glucose, lactose, sucrose, corn, starch, potato starch, sodium carboxymethylcellulose, ethylcellulose, cellulose acetate, powdered gum tragacanth, gelatin, alginic acid, agar, stearic acid, sodium, calcium and magnesium stearates, sodium lauryl sulphate, polyvinylpyrrolidone, sodium citrate, calcium carbonate and dicalcium phosphate. The pharmaceutical compositions of the invention can also contain other non-toxic adjuvants and modifiers such as dyes, surfactants, perfumes, flavoring agents, preservatives and biocides.

Pharmaceutical compositions for parenteral injection employ carriers which are solvents and suspending diluents such as aqueous media and water-miscible organic solvents, in particular sesame oil, groundnut oil, aqueous propylene glycol and N,N'-dimethylformamide. Examples of pharmaceutical compositions of the invention are sterile isotonic saline aqueous solutions which can be buffered with a pharmaceutically acceptable buffer and are preferably pyrogen-free.

The oral and injectable compositions will generally contain 0.5 to 90 wt. percent of 4-(5'-nitrofurfurylidene-amino)-octahydro-4H-1,4-benzthiazine-1,1-dioxide.

The present invention also provides medicaments in unit dosage form comprising 4-(5'-nitrofurfurylideneamino)-octahydro-4H-1,4-benzthiazine-1,1-dioxide, either alone or in admixture with a pharmaceutically acceptable solid or liquid diluent or carrier. In this case the diluent or carrier is preferably as defined above but can also be water or another common solvent. The expression "medicament in unit dosage form" as used in the present specification refers to a medicament in the form of discrete portions each containing a unit dose or a multiple or sub-multiple of a unit dose of the active ingredient as for example, one, two, three or four unit doses or a half, a third or a quarter of a unit dose. A "unit dose" is the amount of the active ingredient to be administered on one occasion in a dosage regimen and will usually be a daily dose, or for example a half, a third, or a quarter of a daily dose, depending on whether the medicament is to be administered once, twice, three times, or four times a day.

The discrete portions constituting the medicament in unit dosage form can include a protective envelope. The active ingredient can be undiluted and contained in such an envelope, or can be mixed with a pharmaceutically acceptable solid or liquid diluent or carrier, as described above. Such portions can for example be in monolithic coherent form, such as tablets, lozenges, pastilles, pills, or dragees; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

What is claimed is:

1. The compound 4-(5'-nitrofurfurylideneamino)-octahydro-4H-1,4-benzthiazine-1,1-dioxide.

* * * * *